United States Patent Office 3,286,196
Patented Nov. 15, 1966

3,286,196
SPARK GAP CIRCUITS FOR SUSTAINING OSCIL-
LATIONS IN TRANSMISSION LINE RESONATORS
Kurt Landecker, Armidale, New South Wales, Australia,
assignor to The University of New England, Armidale,
New South Wales, Australia, a body corporate
Filed Mar. 13, 1964, Ser. No. 351,813
Claims priority, application Australia, Mar. 20, 1963,
28,551/63
14 Claims. (Cl. 331—100)

The invention relates to arrangements for the production of sustained oscillations in electrical circuits and particularly to the production of oscillations of large power.

Many attempts have been made in the past to produce in electrical circuits sustained oscillations, as distinct from damped oscillations, by means other than thermionic vacuum tubes. Whereas damped oscillations of considered power may be produced comparatively easily by discharging an L-C circuit through an electric spark gap in atmospheric air, all attempts to produce by this method sustained high frequency oscillations over an arbitrarily large number of cycles have been unsuccessful.

On the other hand it is well known that thermionic vacuum tubes are comparatively inefficient generators of oscillations. They are particularly unsuitable to pass high currents and such valves and their associated equipment become prohibitively costly for powers larger than about one megawatt. In the range of power considered here the feeble oscillations produced in certain circuits by transistors may be disregarded.

The object of the present invention is the production of such sustained oscillations without the use of thermionic vacuum tubes with their inherent limitations. More specifically, this invention relates to a new principle of transferring energy into an oscillating circuit by means of a distributed circuit element of transmission line type and to its associated fast switching devices. Furthermore certain switching arrangements are disclosed which are particularly advantageous in carrying out the invention and which take the form of gas discharge gaps, solid state rectifiers, ferrite cored inductances and tubes suitable for the propagation of shock waves.

The invention will be explained and described by way of example hereinafter in connection with the drawings in which.

Figure 1:
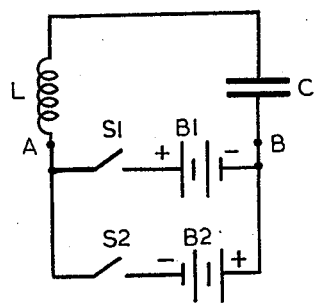
FIGURES 1 and 2 show schematic circuits explaining the principle of the invention.

In FIGURE 1 a tuned circuit is shown consisting of an inductance L in series with a capacity C. The circuit is completed by one of two batteries B1 and B2 in series with their associated switches S1 and S2 respectively. Let it be supposed that at one instant of time the circuit is already in a state of oscillation. The charge lost by the condenser C during consecutive half cycles could then be replenished from the batteries by alternately opening and closing the switches S1 and S2 during consecutive half cycles, provided the switches can be made to operate as described at high speeds. It is obvious that mechanical switches are far too slow in operation for this purpose at useful frequencies of oscillation.

However it is well known that spark gaps exhibit a preferred polarity of breakdown when one electrode terminates in a sharp point and the other electrode has the form of a flat plate. For example, in atmospheric air such gaps have a much lower breakdown potential when the point is positive and the plate negative than for the opposite polarity. Such gaps may therefore be called upon to perform the duty of the switches in the circuit represented in FIGURE 1, and a modified circuit showing schematic representations of "point-to-plane" spark gaps instead of switches is given in FIGURE 2.

However, this arrangement has a fundamental defect which hitherto has prevented the exploitation of this simple principle for the generation and maintenance of sustained oscillations as an alternative current path, in the direction of the curved arrow (FIGURE 2) is formed. Unless the spark gaps open and close in time with an extreme accuracy in relation to one cycle of oscillation the two batteries (or some other form of power supply) will be short circuited and destroyed by the heavy current passing through both batteries and spark gaps in series. Furthermore, it is well known that any form of discharge through a gas, be it through a spark gap or thyratron or any other discharge device, needs time of the order of one hundred microseconds to deionize to a low level. During this time the discharge gap will pass current in either direction if a potential of appropriate polarity is applied across the gap. It is this circumstance which rules out all known discharge devices for the purpose specified above unless they are arranged in accordance with this invention as will be explained in detail hereinafter.

Figure 3A:
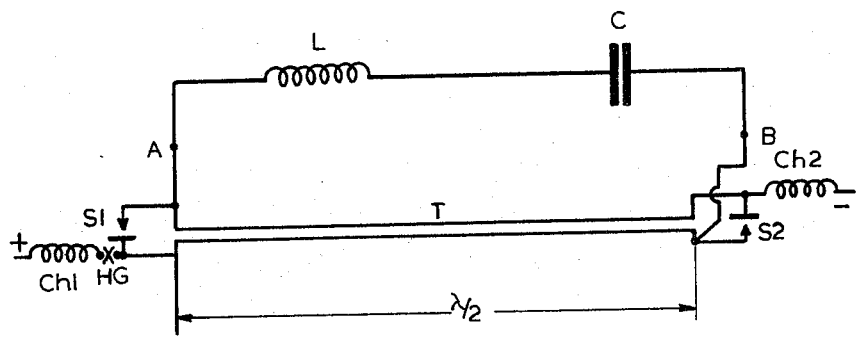
FIGURES 3a and 3b show schematically an electric circuit incorporating the invention.

This invention overcomes these difficulties by an electric circuit having a series tuned L-C circuit connected to opposite conductors at opposite ends of a low-loss transmission line as shown schematically in FIGURE 3a. The transmission line has an electrical length of one half of one wave length at the working frequency. The opposite conductors of the transmission line are bridged at each end by a fast one-way switch, the direction of easy current flow for each of the switches being as indicated in the figure. The power supply is connected for example over high frequency chokes to opposite conductors at opposite ends of the transmission line.

In FIGURE 3a A and B are the terminals of the series tuned circuit L-C and T represents the low-loss transmission line which is electrically one half lave length long at the working frequency. This line acts as a storage element for the energy to be converted into oscillation energy and will therefore be referred to hereinafter as the storage line. Each conductor is alternately connected to the terminals A, B of the tuned circuit on opposite sides of the line. The components Ch1 and Ch2 are radio frequency chokes. In addition the line terminals on opposite sides are joined to fast switches S1 and S2. The exact nature of these switches will be described below; in the first instance it is sufficient to visualize these switches as unidirectional "point-to-plane" spark gaps similar to those mentioned before. The dielectric constant of the material of the storage line is assumed to be considerably larger than unity. The spark gaps HG can be diregarded at this stage and references thereto will be made later on.

The mode of operation of this arrangement may be described as follows: When the two conductors of the line are connected to a voltage supply through the chokes Ch1 and Ch2 then the condenser in the tuned circuit as well as the conductors of the transmission line take on charges of opposite polarity. Supposing that at one instant of time switch S1 on the left hand side breaks down.

Then the condenser C in the tuned circuit begins to discharge and thereafter charges to opposite polarity while the current in the circuit performs one half cycle of oscillations. This current passes through the lower conductor of the transmission line. Simultaneously an impulse voltage wave runs along the transmission line emptying the line of its charge and arriving at the other pair of terminals at the end of the first half cycle. Since the right hand switch S2 still open the voltage wave reverses polarity and the switch S2 breaks down. At the same instant the current in the tuned circuit passes through zero so that the left hand switch S1 open circuits. During the second half cycle the current passes through the upper conductor of the transmission line. Throughout the duration of the second half cycle a charging wave progresses from the voltage supply into the line from left to right and arrives at the right hand terminals at the exact moment when switch S2 opens. Then switch S1 closes and a charging wave proceeds along the line from right to left. Provided the switches S1 and S2 operate as described these cycles repeat indefinitely. The net effect of this operation is that the amplitude of oscillation is maintained at a constant magnitude in spite of a continuous dissipation of energy due to wanted or unwanted losses. This is because the charge accumulated on the half wave line is continuously and periodically being imparted to the tuned circuit replenishing the charge lost by the condenser during consecutive half cycles. It should be noted that the first few cycles in general are expended in building up the oscillation amplitude in the tuned circuit until equilibrium with circuit losses is established. However, the potential difference between the conductors of the storage line is solely determined by the break down potential of the switches and remains constant. The equilibrium amplitude of oscillations may also be influenced by various means of modulation if desired.

Figure 2:
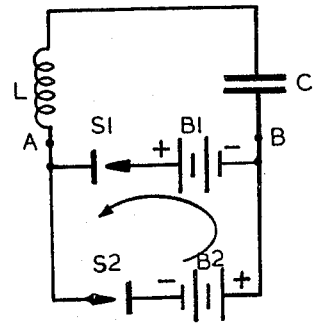

It should be particularly noted that the storage line is the cause of a fundamental difference in behaviour between the circuits represented respectively by FIGURE 3a and FIGURE 2. If, in the presence of the storage line, the switches S1 and S2 do not open and close quite accurately at the theoretical instants of time when the current in the L-C circuit passes through zero then a fraction of the energy supplied to the line will be lost by the current passing through the switches at an inappropriate phase of the oscillation. Provided, however, the switches are not closed simultaneously during times exceeding one entire half cycle of oscillation the power supply can never be completely short circuited in contradistinction to the situation described in connection with the circuit according to FIGURES 1 and 2. The requirement of accuracy of operation of the switches is therefore by the intervention of the storage line relaxed by a very large factor.

The mode of operation of the circuit as described should be considered as the "ideal" mode. In practice certain small deviations from the ideal operation may be tolerated as explained below.

It should be further noted that, since the oscillating current passes during alternative half cycles respectively through the upper and lower conductor of the transmission line, these conductors contribute a considerable amount of inductance to the inductance L of the tuned circuit. In order to keep the inductance of the conductors small it is desirable to make the dielectric constant of the dielectric of the line high. A suitable dielectric is, for example, water which reduces the line length by nearly a factor of ten as compared to air. Alternatively and advantageously ceramic dielectrics such as barium titanate, strontium titanate, ferrites and similar compounds may be used either by itself or in conjunction with other dielectrics providing, for example, high dielectric breakdown strength. In FIGURE 3a the line is drawn in straight form for the sake of illustration only but it may be curved to any desired shape.

Figure 3B:
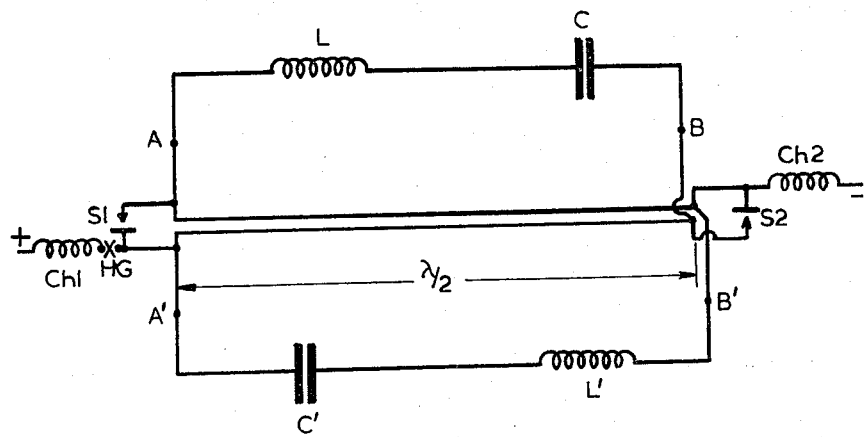

A useful alternative form of the invention is shown in FIGURE 3b. In this form the transmission line is used to supply two tuned circuits L-C and L'-C' instead of a single circuit. Then the energy stored in the halfwave line is divided up between the two circuits. The circuits may be independent or coupled by mutual inductance to achieve a kind of tandem operation. This arrangement makes the currents in the conductors of the storage line perfectly symmetrical with respect to each other and facilitates the operation of the switches S1 and S2.

Figure 4A:
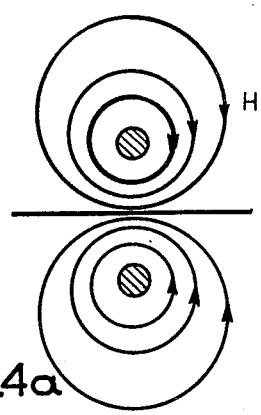
FIGURES 4a and 4b show the magnetic field lines associated with the flow of current in a circuit according to the invention.
Figure 4B:
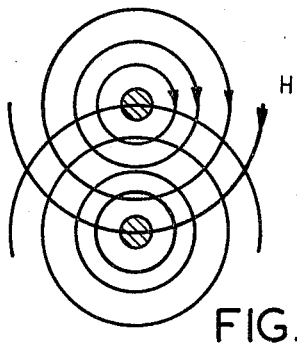

Regarding the operation of the circuit described and illustrated by FIGURES 3a and 3b it should be pointed out that two different modes of propagation of the electrical effects along the transmission line are involved. The impulse and charging waves propagate along by successively charging the elements of distributed inductance and distributed capacity of the line. The magnetic fields associated with these currents exhibit the well known field pattern represented schematically in FIGURE 4a for the case of a two-wire line. The oscillating current in the tuned circuit on the other hand passes at any one time through only one of the conductors of the line. The magnetic field associated with this current is schematically shown in FIGURE 4b. The essential difference between the two field patterns is that in the latter case the field lines completely ignore the second conductor and the speed of propagation is almost independent of the dielectric of the line and closely equals the velocity of light. The two modes of propagation in no way interfere with each other.

Figures 5A, 5B:
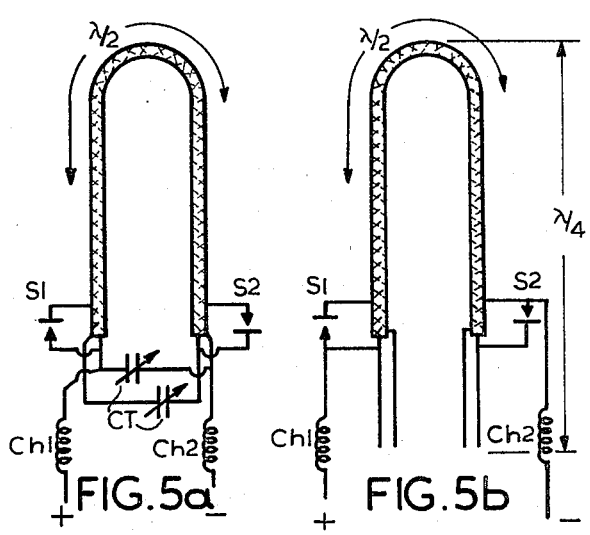
FIGURES 5a, 5b and 5c show other forms of the basic circuit represented by FIGURES 3a and 3b.
Figure 5C:
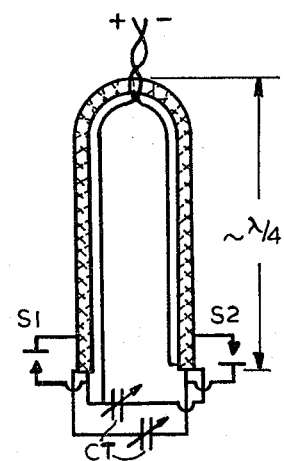

As a useful alternative means for providing proper operating conditions the lumped circuits FIGURES 3a and 3b can be transformed into a distributed circuit as shown for the case of a coaxial storage line in FIGURES 5a, 5b and 5c. If the dielectric of the storage line is, for example, polythene and if the line is folded into the shape of a hairpin then the resulting configuration constitutes a new line which is slightly shorter than one quarter of one wavelenght since the dielectric of the hairpin line is air. To tune this line to the working frequency it is necessary to connect small tuning condensers CT across the inner and outer conductors at the open end as shown in FIGURES 5a and 5c or to extend the inner and outer conductors beyond the open end of the line as shown in FIGURE 5b. The inductance L (and L') and the capacity C (and C') of the original tuned circuits are now absorbed into the distributed inductance and distributed capacity of the resulting quarter wave line. The switches S1 and S2 are still connected between corresponding points of the transformed circuit and perform the same sequence of operations as described in connection with FIGURES 3a and 3b. FIGURE 5c shows a modification of the circuit of FIGURE 5a or FIGURE 5b respectively. The radio frequency chokes Ch1 and Ch2 are replaced by insulated wires conducted along the two sides of the quarter wave line. Since there is a voltage node at the closed end of the quarter wave line there is no standing wave beyond the closed end provided the insulated leads are twisted together for some distance. Small chokes may still be provided to assist the choking action of the wires.

The radio frequency energy may be taken out of the line by one of several well known means. For example, the line may be inductively coupled into a tuned tank circuit or, alternatively, the terminals of the load may be tapped at suitable matching points in the quarter wave line in the vicinity of the closed end.

In practice the circuit incorporating the storage line operates as described with actual spark discharge gaps only at very low frequencies. For higher frequencies useful for the purposes of radio transmission, radar, industrial heating, particle acceleration and the like it is necessary to devise more suitable switches. However, it may be shown in detail that rapidity of switching action is not the only requirement such switching devices have to meet. If oscillations are to build up from a quiescent condition of the circuit it is first necessary that the switch is capable of holding off a given voltage of arbitrary polarity and of breaking down thereafter in avalanche fashion for one particular polarity so that the current builds up to a high value in an extremely short time. In addition the current flow for the opposite polarity must be capable of being inhibited completely or at least reduced to a small residual value. Such switching devices according to this invention will now be described.

Figure 6:
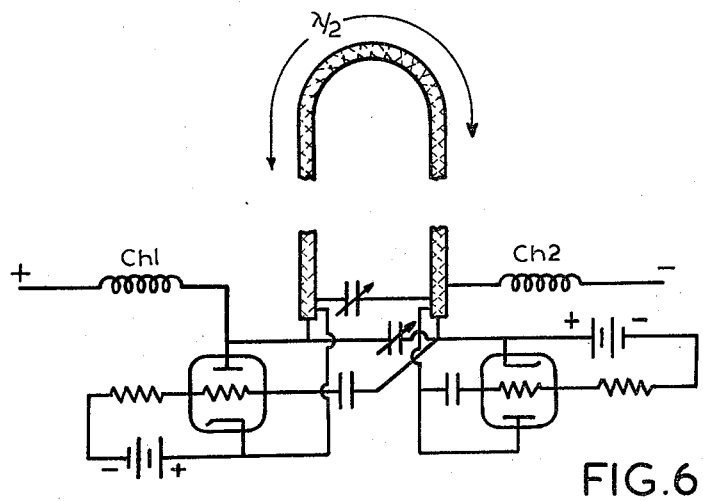
FIGURE 6 shows an embodiment of the invention incorporating vacuum tubes.

It has been found experimentally that "hard" vacuum tubes may perform the action of these fast switches at frequencies of tens of megacycles per second and higher. One such arrangement is shown in FIGURE 6. The operation of this circuit may best be described by observing that the vacuum tube circuit operates in the manner of the well known multivibrator circuit with the important difference however that the coupling elements between anodes and cathodes are distributed rather than lumped elements. Although this circuit operates very satisfactorily at moderate powers, standard thermionic vacuum tubes are not very suitable to pass high currents unless very special tubes such as high current secondary emission tubes are constructed. The arrangement is, however, very useful for the original setting up and tuning of the circuit even when different types of switching devices are ultimately used at full power.

Figure 7A:
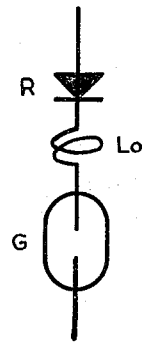
FIGURES 7a, 7b and 7c show switching aggregates for use with the circuits of the invention.

An arrangement according to the invention will now be described which satisfies all the requirements of proper switching action mentioned before and which allows oscillations of very high power to be produced in circuits as described previously in connection with FIGURES 3a, 3b, 5a, 5b and 5c. This switching aggregate consists essentially of a combination of a rectifying device, in particular but not necessarily a solid state rectifier, and a discharge gap as shown in FIGURE 7a. This figure shows schematically a switching aggregate, a pair of which is capable of actuating any of the above circuits such as, for example, shown in FIGURES 3 and 5. It is well known that solid state rectifiers are available which employ substances like silicon, selenium and the like and which can carry currents of the order of 1000 amps. in the forward direction through an active area of a few square centimeters. In the opposite direction they are capable of holding off voltages of the order of 1000 volts. In addition numbers of such units may be arranged in series and parallel in order to obtain any desired maximum currents and maximum hold-off voltages. The voltage drop of such units in the forward direction is of the order of one volt and therefore completely negligible in the service they are called upon to perform. In FIGURE 7a the rectifier is denoted by R and the associated spark gap by G. The latter may be an open gap operating in atmospheric air or the gap may be enclosed in an envelope filled with a gas such as hydrogen at a suitable pressure. The breakdown voltage of such a gap may be adjusted by suitably selecting the gas, the gas pressure and the electrode distance. During operation the breakdown voltage of the spark gap should at all times be smaller than the maximum permissible hold-off voltage of the rectifier. The switching action is improved if a small inductance $L_o$ is arranged in series with the rectifier and the spark gap. Such combinations of rectifiers and spark gaps are useful up to frequencies of approximately one hundred kilocycles. For higher frequencies the rectification efficiency of such rectifiers diminishes rapidly.

Figure 7B:
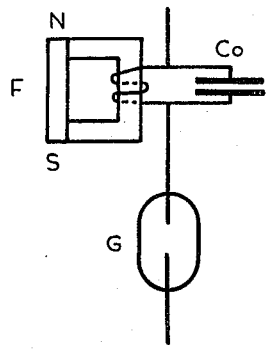

A switching aggregate will now be described whose essential elements consists according to this invention of a saturable reactor. FIGURE 7b is a schematic representation of one particular arrangement of this aggregate. In this figure F is a saturable reactor which consists of a winding of one or more turns on a magnetic core. This core is biased by a steady magnetic field towards its saturation value. If a transient potential is applied to the winding of the reactor the current response depends strongly on the polarity of the transient. This is because for one direction of current the winding offers a very small reactance to the current flow since the core is saturated for this direction of the magnetic field and for the opposite direction of current flow the winding offers a very high reactance which depends on the permeability of the core material. If in addition transients of opposite polarity are applied to the winding in a periodic sequence it is possible to make the change over from the low reactance to the high reactance condition occur spontaneously. This is achieved according to this invention by connecting a condenser $C_o$ across the winding of the reactor. The capacity of this condenser should be adjusted such that the combination of saturable reactance and condenser is in the neighbourhood of resonance at the frequency of oscillation of the tuned circuit under conditions when the magnetic bias is absent. The optimum capacity, however, cannot be calculated with any accuracy since the reactance of the winding is highly nonlinear. This difficulty is well known and appreciated in the theory of magneic amplifiers and the most favourable value of $C_o$ must be established by experiment. In the particular embodiment of the invention represented by FIGURE 7b the winding of the saturable reactor is in series with a spark gap G similar to the gaps mentioned before.

It is an important feature of this invention that if a pair of switching aggregates are connected to the tuned circuit and to the storage line so as to perform the action of the switches S1 and S2 then the switching aggregates become unstable. The switching aggregates may in fact be looked upon as a magnetic multivibrator coupled by the tuned circuit. The action of the circuit may be described as follows:

In the quienscent condition the condenser $C_o$ carries no charge since it is shunted by the winding of the saturable reactor. When the spark gap G breaks down with a polarity corresponding to an increase in the biasing field then the parallel combination of condenser $C_o$ and the saturable rector F offers a very low reactance to the flow of current and the condenser acquires only a small charge. When the current through the tuned circuit reverses after one half period of oscillation it begins to flow through the saturable reactor in a sense of decreasing magnetic bias. Then the reactance of the combination changes to a very high value. The change over from the low reactance to the high reactance condition takes place with extreme rapidity because the rate of change of current through the reactance winding is a maximum while the current circulating in the tuned circuit passes through zero. The effect of this change-over is that during the second half cycle the combination provides a counter electromotive force which is in opposition to the charging voltage applied to the storage line and therefore reduces the current through the spark gap to a low value thus allowing the storage line to be charged. Phenomena of instability similar to the one described are known to occur in magnetic amplifiers and are sometimes referred to as "ferro-resonance."

The group of materials known as ferrites are particularly suitable as core materials for this service because these substances have a high effective permeability up to frequencies of hundreds of megacycles per second and their saturation magnetization ranges from a few oersteds to several hundred oersteds depending on the type of ferrite. The losses in these substances are also very small even at very high frequencies.

The biasing field may be produced by a separate winding carrying a D.C. current or by a permanent magnet, the latter alternative being shown schematically in FIGURE 7b. The biasing magnet may be advantageously made of a type of ferrite having a high magnetic remanence and high coercive force. If a separate bias winding is employed this may also be used to modulate the oscillations in the circuit.

The start of oscillations is facilitated by arranging a hold-off spark gap in series with the voltage supply. For example, such a hold-off spark gap HG may be inserted as shown in FIGURES 3a and 3b.

It should be mentioned that the circuit incorporating the saturable reactors and condensers will oscillate even when the spark gaps G are omitted or short circuited. However, it has been found that the stability of oscillations in the circuit then depends more critically on a change of load.

A further development of a switching aggregate employing saturated reactors in the manner described above is shown diagrammatically in FIGURE 7c. Here a pair of identical saturable reactors F, condensers Co and spark gaps G are shown which are capable of performing the action of the switches S1 and S2. An essential feature of this arrangement is that the main winding on each reactor which is shunted by its associated condenser Co is placed in series with a smaller auxiliary winding on the core of the other reactor. The sense of the auxiliary winding around the core is arranged such that in the direction of strong current flow it reduces the biasing filed of in its own core. It is then found that the multivibrator action of the circuit is improved and that the starting of oscillations is facilitated when the circuit is comparatively heavily loaded.

Figure 7C:
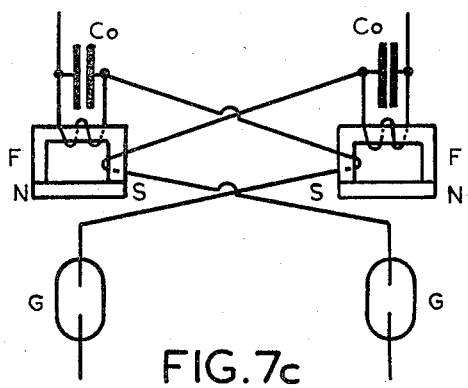

It is furthermore advantageous to arrange both coils on each magnetic core shown in FIGURE 7c in a balanced fashion. This may be achieved by dividing the turns of each coil into two equal parts connected in series and winding the two series coils each on to the outer leg of a three legged core. Then it is found that very little or no magnetic bias is needed and that the condenser Co may be vary small or even entirely omitted.

The two spark gaps associated with the two saturable reactors shown in FIGURES 7b nd 7c may be enclosed in separate envelopes or in a common envelope. They may also be fitted with triggering electrodes to initiate the break down. A particular arrangement of spark gaps in a common envelope will be described below in detail.

It has been established by experiment that the circuit incorporating the switching aggregates represented respectively by FIGURES 7b and 7c will operate under some circumstances even when no magnetic bias is applied to the saturable reactors. However, then it is more difficult to start the oscillations and the operation is more critical with respect to changes of load.

A further arrangement according to the invention which combines the advantages of spark gaps in respect to their capacity to pass very high currents and of thermionic vacuum tubes in respect to their high speed of operation will now be described in connection with FIGURES 8a and 8b, which show one form of a new switching device referred to hereinafter as a "shock-tube." The tube S designed on magneto-hydrodynamic principles is constructed of insulating material such as Pyrex glass or quartz and is originally highly exacuated through a pump connection PC. Thereafter, it is filled through gas inlet GI with a suitable gas, for example, hydrogen, to a pressure of the order of 0.001 mm. of mercury. The identical electrode pairs S1 and S2 perform the same action as the action as the switches S1 and S2 mentioned before while the letters A and B identify respectively the same circuit points as before, that is, the terminals of a tuned circuit connected to a storage line as shown in FIGURE 3a. When voltage is applied to the storage line the switches S1 and S2 do not pass an appreciable current because the gas pressure in the tube is too low to initiate an ionizing avalanche process in the neutral gas. However, when a brief pulse of current is passed through a pair of auxiliary electrodes AF a strong shock wave is generated which travels towards electrode pair S1. This initial current pulse may be started in various ways, for example, by an external radio frequency circuit outside and in close proximity to the glass envelope of tube S or with the aid of a static magnetic field. Alternatively a mechanical shock as for example, that from an "exploding wire" may be used. When the initiating shock wave reaches S1 this gap breaks down passing a high current, as it is well known that the pressure and gas density in the shock front are many orders of magnitude higher than in the undisturbed gas. Simultaneously the discharge through S1 itself generates a strong shock wave which travels towards S2. When it reaches S2 this gap breaks down. It is an essential point of this invention that the dimensions of the tube and other factors enumerated later are so arranged that the time the shock wave takes to travel through the distance $d$ from S1 to S2 equads one half period of oscillation of the tuned circuit connected to S1 and S2, the distance $d$ corresponding to the travelling time in the half wave transmission line T of FIGURE 3a, which acts as a storage line for the electric charge to be transferred to the oscillating tuned circuit connected to the terminals A and B. Calculations and experiments show that for frequencies of the order of megacycles per second this may be achieved with a distance $d$ between S1 and S2 of the order of one centimeter. The velocity of the shock front is sometimes specified by the "Mach number," that is, the ratio of the velocity of the shock front to the velocity of sound in the undisturbed gas. At present Mach numbers far in excess of 100 have been realized. Once the shock front has passed one electrode pair the gas pressure drops rapidly to its original low value. At the same time the current amplitude in the tuned circuit passes through zero so that the discharge extinguishes. The breakdown of S2 in turn causes a shock wave to travel in opposite direction towards S1 and to initiate a renewed breakdown of this gap. Once the first discharge is initiated the sequence of operation continues indefinitely without any further use of the auxiliary electrodes AF provided the supply of energy is maintained. It is an inherent property of this shock tube that when properly adjusted for a given frequency of oscillation, a shock wave generated by a discharge of one gap arrives by necessity at the other gap at the exact moment when this second gap is called upon to conduct current, which is also the identical instant of time when the first gap extinguishes and the gap pressure in this first gap returns rapidly to its original low value. Since both gaps are physically identical and situated within the same surrounding gas they interchange their role of generating and receiving shock waves from half cycle to half cycle and therefore the sequence of events continues indefinitely. If the supply voltage is high enough oscillations may be started by providing hold-off spark gaps HG1 and HG2 in series with each electrode pair. After the first break down these gaps maintain the current through the electrodes but otherwise do not take part in the switching operation. Extinction of the discharge may be facilitated by employing saturable reactor aggregates in series with the electrode gaps similar to those described previously in connection with FIGURES 7b and 7c. Instead of the pair of hold-off gaps HG1 and HG2 a single hold-off gap may be used in series with the voltage supply. Simple means are provided to absorb the various shock fronts when they reach the ends of the tube S in order to avoid unwanted reflections. For example, it was found sufficient to taper the ends of the tube to a distance of about two to three tube diameters.

Figure 8A:
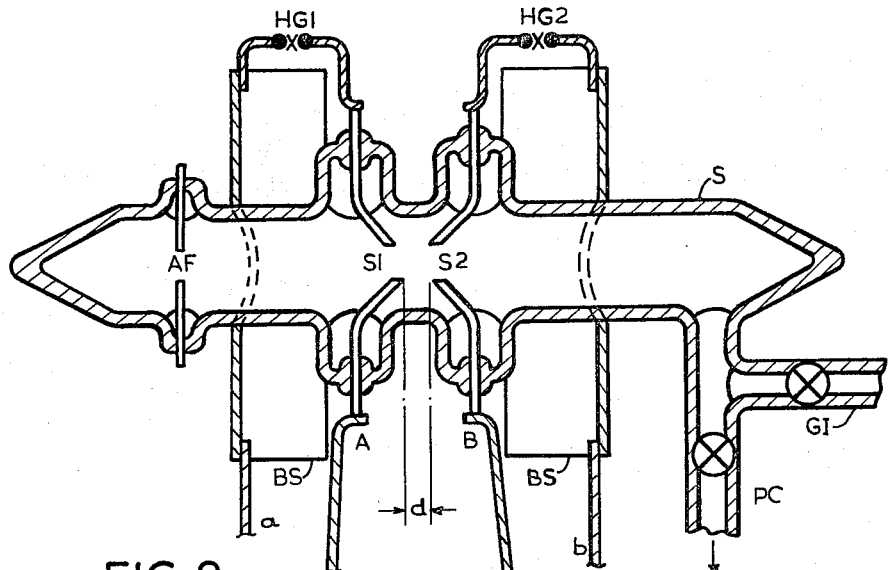
FIGURES 8a and 8b show an embodiment of the invention using a shock tube as a fast switching device.
Figure 8B:
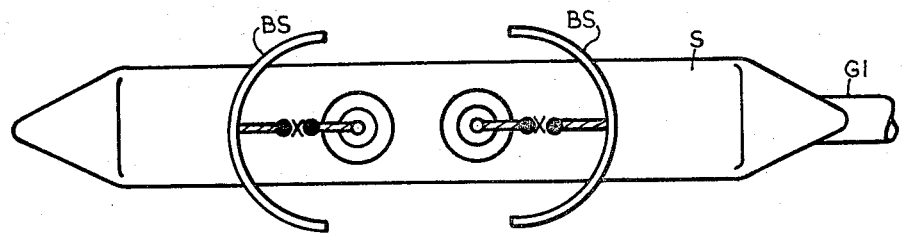

The main factors that determine the velocity and strength of the shock wave and therefore the proper operation of the circuit are the following: the shape and size of the tube, the shape and size of the electrodes, the type of fill gas, the initial gas pressure, the distance $d$ between gaps S1 and S2 and in particular also the positioning of the external current leads $a$, $b$ in FIGURE 8a. The position of these leads is not arbitrary but determines the so-called "magnetic pressure" in the vicinity of gaps S1 and S2 respectively. This magnetic pressure effect is to a large extend responsible for the acceleration of the shock front and these leads may therefore be advantageously used for adjustment of the operating conditions. When a lead is moved in close proximity to the gap to which it forms the current path then the velocity of the shock front is increased. When the lead is moved further away from its associated gap then the shock front velocity is decreased. For this adjustment to be effective the lead must be at all times parallel to the direction of current flow through the gap. In the terminology of current shock wave technique these return leads are usually referred to as "backstraps." A suitable shape of these backstraps BS is that of conducting half cylinders as shown in FIGURES 8a and 8b.

The function of the shock tube will be further explained by a numerical example: Let it be supposed that the distance $d$ between the two discharge gaps S1 and S2 is made exactly 1 cm. which is easy to achieve. In a practical tube this distance $d$ could, if necessary, be made much smaller—say 0.2 cm. Let the fill gas be hydrogen in which the velocity of sound is about 1300 meters per second at room temperature and is very nearly independent of pressure. Finally, let the Mach number be 100, a value which has frequently been attained in laboratory experiments with shock waves. Then the velocity of the shock front amounts to $$1300 \times 100 = 1.3 \times 10^5$$

meters per second or $1.3 \times 10^7$ cm./sec. The distance $d=1$ cm. is therefore traversed by the shock front in a time $1/(1.3 \times 10^7) = 7.7 \times 10^{-8}$ sec. and from what has been mentioned before this equals one half period of oscillation. The full period of oscillation is therefore $1.54 \times 10^{-7}$ sec. which corresponds to a frequency of $1/(1.54 \times 10^{-7}) = 6.5 \times 10^6$ cycles/sec. or 6.5 megacycles per second. This particular shock tube is therefore capable of generating oscillations whose range would cover the important broadcast band of frequencies and other bands up to 6.5 mc./s. Although it is not possible to state an exact upper frequency limit for a shock tube constructed according to the principles of this invention, it appears that the calculated frequency of 6.5 mc./s. could be exceeded by a factor of 10 or more.

From the foregoing it appears that according to the invention powerful sustained oscillations can be generated in a tuned circuit for any purpose, in particular for the generation of radio waves, by fast switches other than thermionic vacuum tubes by replenishing at regular intervals, but preferably after every consecutive half cycle, the charge lost by the condenser of the tuned circuit due to wanted or unwanted losses. This is made possible by the use of specified gas discharge gaps with or without the aid of rectifiers or saturable reactors in combination with a transmission line in which the electrical charge in portions appropriate to one half cycle is first stored and in which electrical potentials can propagate only with a finite velocity which is always less or at most equal to the velocity of light in free space. According to the invention the requirements of accuracy in timing of the fast switches are brought within practically attainable bounds by the application of this storage line principle.

I claim:

1. Arrangement for the production of sustained oscillations in electric circuits, said arrangement comprising a distributed circuit element of transmission line type having two substantially parallel conductors in a dielectric medium, a source of potential electrically connected to one and the other of said conductors respectively at opposite ends thereof, a resonant circuit electrically connected with the conductors at the other opposite ends thereof, and fast operating switching means electrically connected between adjacent ends of said conductors to connect and disconnect said adjacent ends, said fast operating switching means being activated by the periodically oscillating current in said turned circuit, and the length and dielectric medium of said distributed circuit element being adjusted for a propagation time of said oscillations equal to one half period of oscillation of said resonant circuit, such that the energy associated with a travelling wave progressing periodically from the source of potential through the distributed circuit element of transmission line type is received by the resonant circuit with the correct polarity and in the correct phase of oscillation thereby sustaining the amplitude of oscillation.

2. Arrangement for the production of sustained oscillations as set forth in claim 1 in which said dielectric medium is a ceramic dielectric material of high permittivity.

3. Arrangement for the production of sustained oscillations as set forth in claim 1 in which said dielectric medium is a ceramic dielectric material selected from the group consisting of barium titanate, strontium titanate and ferrite.

4. Arrangement for the production of sustained oscillations as set forth in claim 1 in which said distributed circuit element of transmission line type together with said fast operating switching means is shaped to form a transmission line element substantially equal to an electric length of one quarter of one wave length in air, the quarter wave transmission line element having distributed capacity and distributed inductance forming at least partly said resonant circuit, whereby the propagation time of the progressive wave along the conductors of said distributed circuit element remains equal to one half period of oscillation of the quarter wave transmission line element in air.

5. Arrangement for the production of sustained oscillations as set forth in claim 4 in which the dielectric medium of the distributed circuit element is a ceramic dielectric material selected from the group consisting of barium titanate, strontium titanate and ferrite.

6. Arrangement for the production of sustained oscillations as set forth in claim 1 in which each fast operating switching means consists of a spark gap in series with a reactance, said reactance having a core of magnetically saturable material and a winding on said core.

7. Arrangement for the production of sustained oscillations as set forth in claim 6, including a condenser connected in parallel to said winding, said winding with said condenser being tuned approximately to the frequency of said oscillations.

8. Arrangement for the production of sustained oscillations as set forth in claim 7 in which the core of said reactance is made from ferrite.

9. Arrangement for the production of sustained oscillations as set forth in claim 1 in which said fast operating switching means comprise two identical switching units, each said unit consisting of a saturable reactance having a main winding and an auxiliary winding, a condenser connected in parallel to the main winding of said reactance, and a spark gap, each spark gap of one unit being connected in series with the auxiliary winding of the reactance of the other unit and the main winding of the reactance of said one unit to form a magnetic multivibrator.

10. Arrangement for the production of sustained oscillations as set forth in claim 9 in which the spark gap of each switching unit is enclosed in an envelope.

11. Arrangement for the production of sustained oscillations as set forth in claim 1 in which said fast operating switching means comprise two switching units, each said unit including a spark gap and the spark gaps of the two switching units are enclosed in a common envelope.

12. Arrangement for the production of sustained oscillations as set forth in claim 11 in which the common envelope enclosing the two spark gaps forms a shock tube device, each spark gap having a pair of electrodes, the distance between one pair of electrodes and the other pair of electrodes being one-half period of oscillation of the oscillation frequency, said common envelope being filled with gas at low pressure.

13. Arrangement for the production of sustained oscillations as set forth in claim 12 in which hold-off spark gaps outside said envelope are connected in series with corresponding pairs of electrodes inside said envelope.

14. Arrangement for the production of sustained oscillations as set forth in claim 12 and having a pair of auxiliary electrodes arranged in said envelope, and means connected to said pair of auxiliary electrodes to pass a brief current through said auxiliary electrodes to generate a shock wave in said envelope.

No references cited.

ROY LAKE, *Primary Examiner.*

S. GRIMM, *Assistant Examiner.*